United States Patent
Zhu et al.

(10) Patent No.: US 11,663,248 B2
(45) Date of Patent: May 30, 2023

(54) METHOD AND APPARATUS FOR PROCESSING CONSULTATION INFORMATION

(71) Applicant: BEIJING BAIDU NETCOM SCIENCE AND TECHNOLOGY CO., LTD., Beijing (CN)

(72) Inventors: Dongwei Zhu, Beijing (CN); Haifeng Huang, Beijing (CN); Chao Lu, Beijing (CN); Jialin Wu, Beijing (CN); Yuan Xia, Beijing (CN); Xueying Shi, Beijing (CN); Xiaoqin Li, Beijing (CN); Xiaoming Hu, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/302,385

(22) Filed: Apr. 30, 2021

(65) Prior Publication Data

US 2021/0256044 A1 Aug. 19, 2021

Related U.S. Application Data

(63) Continuation of application No. PCT/CN2020/117348, filed on Sep. 24, 2020.

(30) Foreign Application Priority Data

Mar. 26, 2020 (CN) .......................... 202010221250.3

(51) Int. Cl.
*G06F 16/335* (2019.01)
*G06F 16/34* (2019.01)
(Continued)

(52) U.S. Cl.
CPC ........ *G06F 16/3326* (2019.01); *G06F 16/335* (2019.01); *G06F 16/338* (2019.01); *G06F 16/34* (2019.01); *G06Q 30/0203* (2013.01)

(58) Field of Classification Search
CPC .... G06F 16/3326; G06F 16/34; G06F 16/338; G06F 16/335
See application file for complete search history.

(56) References Cited

U.S. PATENT DOCUMENTS

2013/0304730 A1* 11/2013 Zhou ................. G06F 16/90335
707/723
2014/0189530 A1 7/2014 Anand et al.
(Continued)

FOREIGN PATENT DOCUMENTS

| CN | 105011911 | 11/2015 |
| CN | 106789595 | 5/2017 |

(Continued)

OTHER PUBLICATIONS

International Search Report dated Sep. 24, 2020 for Application No. PCT/CN2020/117348. 10 pages.
(Continued)

*Primary Examiner* — Kannan Shanmugasundaram
(74) *Attorney, Agent, or Firm* — Knobbe, Martens, Olson & Bear, LLP

(57) ABSTRACT

Embodiments of the present disclosure provide a method and apparatus for processing consultation information. A specific implementation of the method includes: pushing, in response to receiving consultation information of a first user, a questionnaire corresponding to the consultation information to the first user; acquiring a questionnaire result corresponding to the questionnaire and submitted by the first user; inputting the questionnaire result into a preset consultation model, to obtain a first consultation result; pushing the questionnaire result and the first consultation result to a
(Continued)

second user; and in response to receiving a second consultation result provided by the second user based on the questionnaire result and the first consultation result, pushing the second consultation result to the first user.

16 Claims, 6 Drawing Sheets

(51) Int. Cl.
*G06F 16/338* (2019.01)
*G06F 16/332* (2019.01)
*G06Q 30/0203* (2023.01)

(56) References Cited

U.S. PATENT DOCUMENTS

| | | | | |
|---|---|---|---|---|
| 2015/0227893 | A1* | 8/2015 | Huynh | G06Q 10/10 705/4 |
| 2016/0371793 | A1 | 12/2016 | Anand et al. | |
| 2017/0206241 | A1* | 7/2017 | Beller | G06F 16/3344 |
| 2019/0117151 | A1* | 4/2019 | Stern | G06T 7/60 |

FOREIGN PATENT DOCUMENTS

| | | |
|---|---|---|
| CN | 107247868 | 10/2017 |
| CN | 108629605 | 10/2018 |
| CN | 109345282 | 2/2019 |
| CN | 109376354 | 2/2019 |
| CN | 109427000 | 3/2019 |
| CN | 109684530 | 4/2019 |
| CN | 109857850 | 6/2019 |
| CN | 110119775 | 8/2019 |
| CN | 110415070 | 11/2019 |
| CN | 110597624 | 12/2019 |
| CN | 111274490 | 6/2020 |
| JP | 2003044488 A | 2/2003 |
| JP | 2007033808 A | 2/2007 |
| JP | 2008186040 A | 8/2008 |
| JP | 2010015313 A | 1/2010 |
| WO | WO 2019/186678 A1 | 3/2019 |
| WO | WO 2019/134166 | 7/2019 |

OTHER PUBLICATIONS

Jul. 19, 2022, Japanese Office Action for Japanese application No. 2021-523687 (5 pages).

* cited by examiner

METHOD AND APPARATUS FOR PROCESSING CONSULTATION INFORMATION

CROSS-REFERENCE TO RELATED APPLICATION

This patent application is a continuation of International Application No. PCT/CN2020/117348, filed on Sep. 24, 2020, which claims priority from Chinese Application No. 202010221250.3, filed on Mar. 26, 2020 and entitled "Method and Apparatus for Processing Consultation Information," the entire disclosure of which is hereby incorporated by reference.

TECHNICAL FIELD

Embodiments of the present disclosure relate to the field of computer technology, and particularly to a method and apparatus for processing consultation information.

BACKGROUND

DSS (Decision Support System) is an interactive system that may be applied in various fields to assist decision makers in making decisions.

At present, the DSS system may also be applied to various consultation platforms. The consultation information of the one who performs the consultation that is acquired by a consultation platform is forwarded to a decision maker through the consultation platform, and the decision maker feeds back reply information to the one who performs the consultation through the consultation platform, thereby implementing the interaction between the one who performs the consultation and the decision maker. By building a consultation platform between the ones who perform the consultation and decision makers, consultation questions may be quickly addressed.

SUMMARY

Embodiments of the present disclosure provide a method and apparatus for processing consultation information.

In a first aspect, some embodiments of the present disclose provide a method for processing consultation information, the method includes: pushing, in response to receiving consultation information of a first user, a questionnaire corresponding to the consultation information to the first user; acquiring a questionnaire result corresponding to the questionnaire and submitted by the first user; inputting the questionnaire result into a preset consultation model, to obtain a first consultation result; pushing the questionnaire result and the first consultation result to a second user; and in response to receiving a second consultation result provided by the second user based on the questionnaire result and the first consultation result, pushing the second consultation result to the first user.

In some embodiments, the consultation information includes a type of consultation content, and the pushing, in response to receiving the consultation information of the first user, the questionnaire corresponding to the consultation information to the first user includes: in response to receiving the consultation information of the first user, searching a target questionnaire corresponding to the type of the consultation content; and pushing the target questionnaire to the first user.

In some embodiments, the questionnaire includes a structured questionnaire, the structured questionnaire being used for collecting basic information of a user related to consultation information of the user.

In some embodiments, the consultation information includes a target consultation question, and the method further includes: in response to there being a first consultation question having a matching degree with the target consultation question greater than a first preset threshold value in a preset consultation database, pushing a consultation result corresponding to a first consultation question to the first user.

In some embodiments, the method further includes: in response to there not being a consultation question having a matching degree with the target consultation question greater than the first preset threshold value in the preset consultation database, searching for a candidate consultation question in the preset consultation database, the candidate consultation question having an association degree with the target consultation question greater than a second preset threshold value, and pushing the candidate consultation question to the first user; and acquiring a second consultation question selected by the first user from the candidate consultation question, and pushing a consultation result corresponding to the second consultation question to the first user.

In some embodiments, the method further includes: pushing common consultation questions having frequencies of being consulted greater than a preset threshold value and consultation results corresponding to the common consultation questions to the first user; and in response to detecting that the first user performs a preset association confirmation operation on a consultation result of a third consultation question, pushing the third consultation information, the consultation result corresponding to the third consultation question, and the questionnaire result into the preset consultation model to obtain a third consultation result.

In a second aspect, some embodiments of the present disclosure provide a method for processing consultation information, the method includes: sending consultation information inputted by a first user to a server; receiving a questionnaire corresponding to the consultation information of the first user; sending a questionnaire result corresponding to the questionnaire and inputted by the first user to the server; and receiving a second consultation result, the second consultation result being submitted by a second user based on the questionnaire result and a first consultation result, and the first consultation result being obtained by inputting the questionnaire result into a preset consultation model.

In some embodiments, the consultation information includes a type of consultation content, and the receiving the questionnaire corresponding to the consultation information of the first user includes: receiving a target questionnaire corresponding to the type of the consultation content.

In a third aspect, some embodiments of the present disclosure provide a method for processing consultation information, the method includes: receiving a questionnaire result submitted by a first user and a first consultation result, the questionnaire result being questionnaire result corresponding to a questionnaire corresponding to consultation information of the first user, and the first consultation result being obtained by inputting the questionnaire result into a preset consultation model; and sending a second consultation result obtained based on the questionnaire result and the first consultation result, to push the second consultation result to the first user.

In a fourth aspect, some embodiments of the present disclosure provide an apparatus for processing consultation information, the apparatus includes: a first pushing unit, configured to push, in response to receiving consultation information of a first user, a questionnaire corresponding to the consultation information to the first user; an acquiring unit, configured to acquire questionnaire result corresponding to the questionnaire and submitted by the first user; a determining unit, configured to input the questionnaire result into a preset consultation model to obtain a first consultation result; a second pushing unit, configured to push the questionnaire result and the first consultation result to a second user; and a third pushing unit, configured to push, in response to receiving a second consultation result provided by the second user based on the questionnaire result and the first consultation result, the second consultation result to the first user.

In a fifth aspect, some embodiments of the present disclosure provide an apparatus for processing consultation information, the apparatus includes: a first sending unit, configured to send consultation information inputted by a first user to a server; a first receiving unit, configured to receive a questionnaire corresponding to the consultation information of the first user; a second sending unit, configured to send questionnaire result corresponding to the questionnaire and inputted by the first user to the server; and a second receiving unit, configured to receive a second consultation result, the second consultation result being submitted by a second user based on the questionnaire result and a first consultation result, and the first consultation result being obtained by inputting the questionnaire result into a preset consultation model.

In a sixth aspect, some embodiments of the present disclosure provide an apparatus for processing consultation information, the apparatus includes: a receiving unit, configured to receive a questionnaire result submitted by a first user and a first consultation result, the questionnaire result being questionnaire result corresponding to a questionnaire corresponding to consultation information of the first user, and the first consultation result being obtained by inputting the questionnaire result into a preset consultation model; and a sending unit, configured to send a second consultation result obtained based on the questionnaire result and the first consultation result, to push the second consultation result to the first user.

In a seventh aspect, some embodiments of the present disclosure provide an electronic device, the electronic device includes: one or more processors; and a storage apparatus, configured to store one or more programs, where the one or more programs, when executed by the one or more processors, cause the one or more processors to implement the method to the first aspect.

In an eighth aspect, some embodiments of the present disclosure provide a computer readable medium, storing a computer program, wherein the program, when executed by a processor, implements the method according to the first aspect.

BRIEF DESCRIPTION OF THE DRAWINGS

After reading detailed descriptions for non-limiting embodiments given with reference to the following accompanying drawings, other features, objectives and advantages of the present disclosure will be more apparent.

DETAILED DESCRIPTION OF EMBODIMENTS

The present disclosure is further described below in detail by combining the accompanying drawings and the embodiments. It may be appreciated that the specific embodiments described herein are merely used for explaining the relevant embodiments, rather than limiting the embodiments. In addition, it should also be noted that, for the ease of description, only the parts related to the relevant embodiments are shown in the accompanying drawings.

It should be noted that the embodiments in the present disclosure and the features in the embodiments may be combined with each other on a non-conflict basis. The present disclosure will be described below in detail with reference to the accompanying drawings and in combination with the embodiments.

Figure 1:
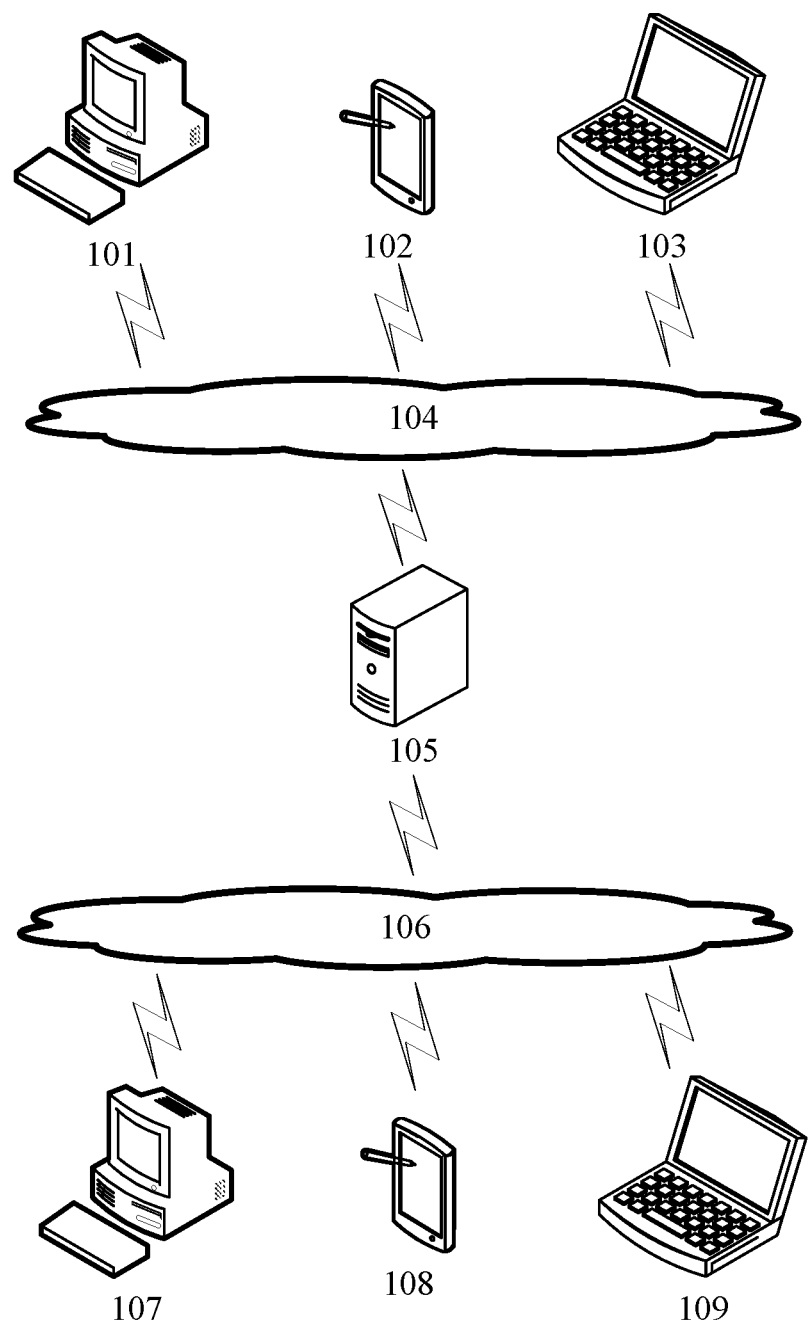
FIG. 1 is a diagram of an example system architecture in which an embodiment of the present disclosure may be applied.

FIG. 1 illustrates an example system architecture 100 in which a method for processing consultation information or an apparatus for processing consultation information may be applied.

As shown in FIG. 1, the system architecture 100 may include terminal device 101, 102, and/or 103, networks 104 and 106, a server 105 and terminal device 107, 108 and/or 109. The network 104 serves as a medium providing a communication link between the terminal devices 101, 102 and 103 and the server 105, and the network 106 serves as a medium providing a communication link between the server 105 and the terminal devices 107, 108 and 109. The networks 104 and 106 may include various types of connections, for example, wired or wireless communication links, or optical fiber cables.

A first user may use the terminal device 101, 102 and/or 103 to interact with the server 105 via the network 104 to receive or send a message (e.g., receive a questionnaire). Various communication client applications (e.g., a consultation platform application, a smart assistant answer application, a social application, a text browsing application, an image browsing application, and a multimedia playback application) may be installed on the terminal devices 101, 102 and 103.

A second user may use the terminal device 107, 108 and/or 109 to interact with the server 105 via the network

106 to receive or send a message (e.g., receive questionnaire result). Various communication client applications (e.g., a consultation platform application, a smart assistant answer application, a social application, a text browsing application, an image browsing application, and a multimedia playback application) may be installed on the terminal devices 107, 108 and 109.

The terminal devices 101, 102 and 103 and the terminal devices 107, 108 and 109 may be hardware or software. When being hardware, the terminal devices 101, 102 and 103 may be various electronic devices having a display screen and supporting an Internet access, which include, but not limited to, a smartphone, a tablet computer, a notebook computer, a desktop computer, and the like. When being software, the terminal devices 101, 102 and 103 may be installed in the above listed electronic devices. The terminal devices may be implemented as a plurality of pieces of software or a plurality of software modules (e.g., software or software modules for providing a distributed service), or as a single piece of software or a single software module, which will not be specifically defined herein.

The server 105 may be a server providing a consultation answering service for the applications installed on the terminal devices 101, 102 and 103 and the terminal devices 107, 108 and 109. The server 105 may receive a consultation request submitted in an application installed on terminal device 101, 102 and/or 103 by the terminal device 101, 102 and/or 103, and may also feed back questionnaire result to the terminal devices 107, 108 and/or 109.

It should be noted that the method for processing consultation information provided by embodiments of the present disclosure may be performed by the terminal device 101, 102 and/or 103, the terminal device 107, 108 and/or 109, or the server 105. Correspondingly, the apparatus for processing consultation information may be provided in the terminal devices 101, 102 and 103, the terminal devices 107, 108 and 109, or the server 105.

It should be appreciated that the numbers of the terminal devices, the networks, and the servers in FIG. 1 are merely illustrative. Any number of terminal devices, networks, and servers may be provided based on actual requirements.

Figure 2:
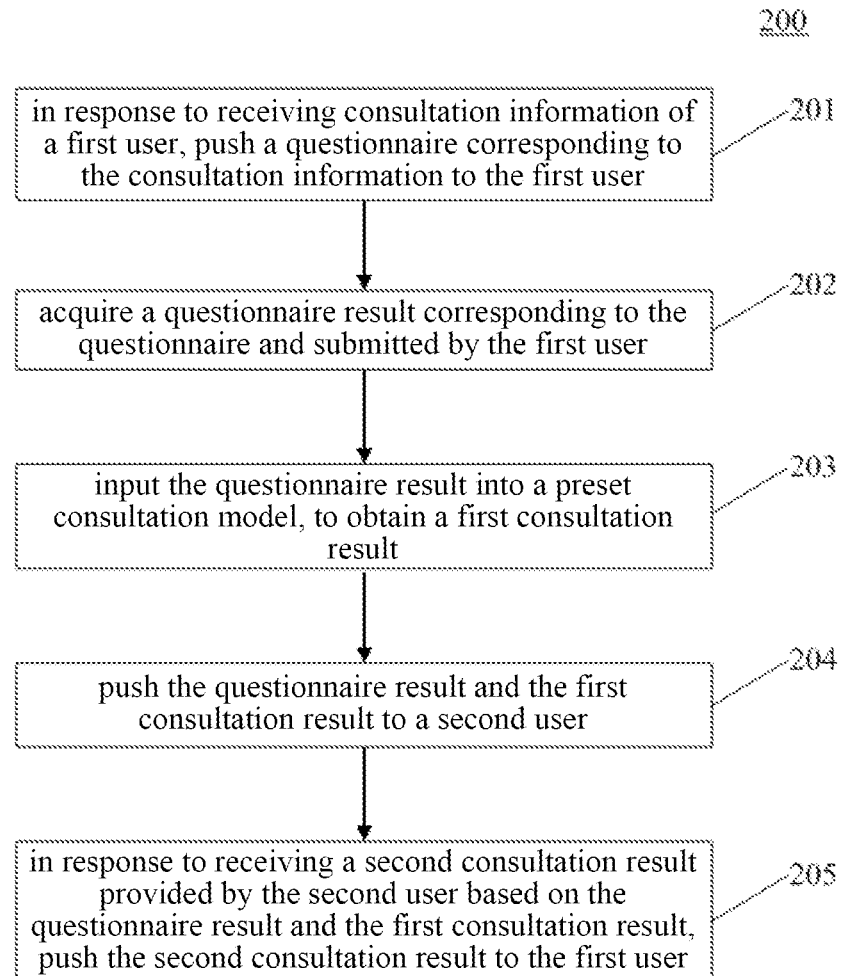
FIG. 2 is a flowchart of a method for processing consultation information according to an embodiment of the present disclosure.

Further referring to FIG. 2, FIG. 2 illustrates a flow 200 of a method for processing consultation information according to an embodiment of the present disclosure. The method for processing consultation information includes following steps:

Step 201, pushing, in response to receiving consultation information of a first user, a questionnaire corresponding to the consultation information to the first user.

In this embodiment, an executing body of the method for processing consultation information may be the server in the system architecture shown in FIG. 1, or another backend device providing support for a consultation platform. The executing body may receive the consultation information of the first user from the consultation platform, search a target questionnaire corresponding to the consultation information from a pre-stored questionnaire set, and push the above target questionnaire to the first user through the consultation platform. Particularly, the first user may be a consulting party issuing a consultation request to the consultation platform. The consultation information may be information proposed and expected to be solved or responded to by the first user, and the specific content of the consultation information may include a description for an event concerned by the first user and expected to be addressed. The questionnaire may be a questionnaire for collecting user's information in the form of questions.

In some alternative implementations of this embodiment, the consultation information includes a type of consultation content. The pushing, in response to receiving the consultation information of the first user, the questionnaire corresponding to the consultation information to the first user includes: in response to receiving the consultation information of the first user, searching a target questionnaire corresponding to the type of the consultation content; and pushing the target questionnaire to the first user.

In this implementation, when receiving the consultation information of the first user, the above executing body may search a questionnaire corresponding to the type of the consultation content from the pre-stored questionnaire set according to the type of the consultation content included in the consultation information, and push the questionnaire to the first user. Particularly, the type of the consultation content is pre-configured, and may correspond to a subject of the consultation object included in the consultation content. For example, if the subject of the consultation object included in the consultation content refers to an order, the type of the consultation content refers to an order type. For example, if the subject of the consultation object included in the consultation content refers to medical treatment related information, the type of the consultation content is a medical treatment type. The above executing body may extract key content in the consultation information based on the consultation information of the first user, and recognize the type of the consultation content according to the key content. Particularly, a keyword table of each preset type may be configured, and the type of a consultation content may be matched out based on the consultation content and the keyword table. Alternatively, a pre-trained model may be adopted for classifying the consultation information to obtain the type of consultation content.

Here, the pre-stored questionnaire set may be various types of questionnaires correspondingly set according to the types of the consultation contents. In this implementation, by setting the questionnaire corresponding to the type of the consultation content and pushing the questionnaire to the first user, the user information corresponding to the type of the consultation content of the first user may be collected more pertinently and more accurately.

Step 202, acquiring questionnaire result corresponding to the questionnaire and submitted by the first user.

In this embodiment, the above executing body may acquire the questionnaire result corresponding to the questionnaire and submitted by the first user. Particularly, the questionnaire result may be information of a questionnaire completed by the first user, for example, information of an answer option which corresponds to a questionnaire question and for which a selection is completed by the user. Alternatively, the questionnaire includes a structured questionnaire, the structured questionnaire being used for collecting user's basic information related to consultation information of the user. Here, the user's basic information may be information associated with the user, for example, physical sign information, itinerary information, and environmental information. The structured questionnaire may be set in the form of a questionnaire question and a corresponding answer option. A corresponding questionnaire result may include the collected user's basic information. The time taken to collect the user basic information is reduced through this alternative implementation, and the corresponding structured user data information is automatically generated by setting the structured questionnaire.

Step 203, inputting the questionnaire result into a preset consultation model, to obtain first consultation result.

In this embodiment, the above executing body may input a questionnaire result of the first user into the preset consultation model to obtain the first consultation result. Particularly, the consultation model may be a model obtained through pre-training based on various kinds of consultation information. By collecting various kinds of user's basic information related to the consultation information of the user and corresponding consultation results, the model is obtained through training by using the various kinds of user basic information related to the consultation information of the user as inputs and the corresponding consultation results as expected outputs. Here, the first consultation result may be a preliminary judgment result made based on the user's basic information and outputted by the consultation model.

Step 204, pushing the questionnaire result and the first consultation result to a second user.

In this embodiment, the executing body may push an initial consultation result outputted by the consultation model and the questionnaire result to the second user. Here, the second user may be an answering party answering the consultation information of the first user.

Step 205, in response to receiving a second consultation result provided by the second user based on the questionnaire result and the first consultation result, pushing the second consultation result to the first user.

In this embodiment, the above executing body may push the received second consultation result to the first user, the received second consultation result being provided by the second user based on the questionnaire result and the first consultation result. Here, the second consultation result may be a final judgment result made by the second user based on the questionnaire result and the first consultation result. The second user may quickly make a judgment and provide a more reliable second consultation result based on user's basic information collected in advance and the first consultation result outputted by the consultation model, thereby reducing the time of the second user in acquiring the basic information of the first user through an interaction with the first user, and improving the efficiency of the answering party in making the final judgment result.

In some alternative implementations of this embodiment, the consultation information may include a target consultation question. The above method further includes: in response to there being a first consultation question having a matching degree with the target consultation question greater than a first preset threshold value in a preset consultation database, pushing a consultation result corresponding to a first consultation question to the first user.

In this implementation, the above executing body may search for a first consultation question matching the target consultation question in the preset consultation database. Particularly, the above executing body may calculate a similarity between the target consultation question and a consultation question in the consultation database to obtain a similarity value, use the similarity value as a measurement index of the matching degree, select a first consultation question having a matching degree with the target consultation question greater than the first preset threshold value, and push the consultation result corresponding to the first consultation question to the first user. Here, the consultation database may include at least one consultation question and a consultation result corresponding thereto which are set in advance. Through this implementation, quickly answer the target consultation question included in the consultation information of the first user may be realized.

In some alternative implementations of this embodiment, the above method further includes: in response to there not being a consultation question having a matching degree with the target consultation question greater than the first preset threshold value in the preset consultation database, searching for a candidate consultation question in the preset consultation database, the candidate consultation question having an association degree with the target consultation question greater than a second preset threshold value, and pushing the candidate consultation question to the first user; and acquiring a second consultation question selected by the first user from the candidate consultation question, and pushing a consultation result corresponding to the second consultation question to the first user.

In this implementation, when there isn't a first consultation question matching the target consultation question in the preset consultation database, the above executing body may search for a candidate consultation question associated with the target consultation question in the preset consultation database, and push the candidate consultation question to the first user. Particularly, the above executing body may: first recognize a keyword included in the target consultation question, search a consultation question containing the same keyword in the consultation database, for using as the candidate consultation question having an association degree with the target consultation question greater than the second preset threshold value, acquire the second consultation question selected from the candidate consultation question by the first user, and search the consultation result corresponding to the second consultation question in the consultation database for pushing the consultation result to the first user. Alternatively, the above executing body may also use the similarity value between the target consultation question and a consultation question in the consultation database as a measurement index of the degree of association. The above executing body may also calculate the similarities between the target consultation question and the consultation questions in the consultation database to obtain similarity values, and select a consultation question having a similarity value with the target consultation question less than the first preset threshold value and greater than the second preset threshold value as the candidate consultation question, to push the candidate consultation question to the first user.

Through this implementation, when a consultation question matching the target consultation question is not presented in the database, the candidate consultation question close to the target consultation question that the user expects to be answered may be pushed to the first user, thereby facilitating the selection of the user.

In some alternative implementations of this embodiment, the above method further includes: pushing common consultation questions having frequencies of being consulted greater than a preset threshold value and consultation results corresponding to the common consultation questions to the first user; and in response to detecting that the first user performs a preset association confirmation operation on a consultation result of a third consultation question, pushing the third consultation information, the consultation result corresponding to the third consultation question, and the questionnaire result into the preset consultation model to obtain a third consultation result.

In this implementation, the above executing body may push common consultation questions having frequencies of being consulted greater than the preset threshold value and consultation results corresponding thereto to the first user. When detecting that the first user performs a preset association confirmation operation on the consultation result of a third consultation question, the above executing body may simultaneously input the consultation result of the third consultation question, the consultation result corresponding to the third consultation question, and the above questionnaire result into the preset consultation model, to obtain the third consultation result, and push the third consultation result to the second user. Here, the preset association confirmation operation may be a preset operation performed by the first user when the first user believes that the consultation result of the third consultation question is helpful to himself/herself.

For example, when detecting that the first user opens a consultation application, the above executing body may push at least one common consultation question and a consultation result corresponding thereto to the first user, and present options "Useful" and "Useless" to the first user for selection. When it is detected that the user selects the option "Useful," it represents that the user believes that the consultation result of the question is helpful. At this time, the above executing body may input the above target common consultation question as the user information into the consultation model, and send the above target common consultation question to the second user for reference.

Through this implementation, common consultation questions may be pushed to the first user to quickly provide a consultation question that may be of interest to the user, and the consultation result corresponding to the consultation question and satisfying the first user may be used as a basis for the judgement performed by the consultation model and the second user, thus enriching the way in which the user acquires the related information. At the same time, the common consultation question on which the user performs the preset association confirmation operation, as another way of acquiring the information of the user, is inputted into the consultation model and sent to the second user for reference, which helps the consultation model and the second user provide a more accurate consultation result.

Figure 3:
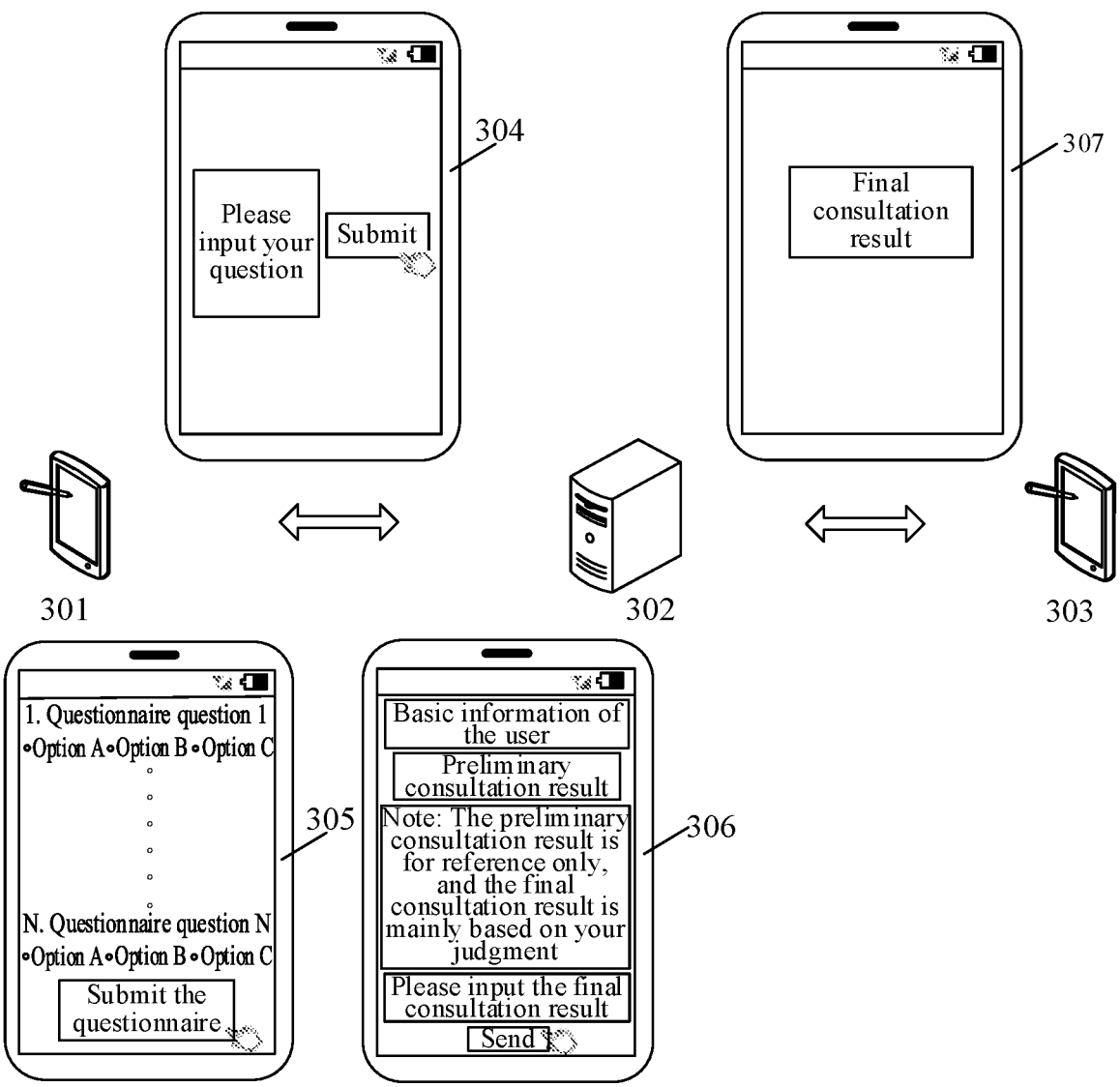
FIG. 3 is a schematic diagram of an application scenario of the method for processing consultation information according to an embodiment of the present disclosure.

Further referring to FIG. 3, FIG. 3 is a schematic diagram of an application scenario of the method for processing consultation information according to some embodiments of the present disclosure. In the application scenario of FIG. 3, a consultation application or a consultation platform may be installed on a terminal 301 used by a first user (a consulting party), and a consultation application or a consultation platform may be installed on a terminal 303 used by a second user (an answering party). When that the first user (the consulting party) logs in to the consultation application or the consultation platform is detected, a page 304 for consultation information inputting is presented to the first user (the consulting party), and the page 304 contains the content "Please input your question." After completing the input of the consultation information, the first user (the consulting party) clicks "Submit." A server 302 receives the consultation information sent by the first user (the consulting party), screens out a questionnaire corresponding to the consultation information from a database, and sends the questionnaire to the terminal 301 used by the first user (the consulting party). The terminal 301 presents a questionnaire page 305 to the first user. When completing the questionnaire, the first user (the consulting party) clicks "Submit the questionnaire." The terminal sends questionnaire result of the first user to the server 302. The server 302 inputs the questionnaire result of the first user (the consulting party) (i.e., the basic information of the first user) into a consultation model to obtain a preliminary consultation result, and then sends the questionnaire result (i.e., the basic information of the first user) and the preliminary consultation result to the terminal 303 used by the second user (the answering party). The terminal 303 presents, in a page 306, the basic information of the first user and the preliminary consultation result to the second user (the answering party). The second user (the answering party) inputs answer content in the page 306 by reference to the basic information of the first user and the preliminary consultation result, and clicks the option "Submit" or "Send" after completing the input, to send final answer content as a final consultation result to the server 302. The server 302 forwards the final consultation result to the terminal 301 after receiving the final consultation result. And the terminal 301 presents a page 307 of the final consultation result to the first user (the consulting party).

The above embodiment may be applied to an on-line knowledge interactive platform or an on-line medical consultation platform. After a questioner initiates a question, an expert may answer the question by reference to a preliminary judgment result of the platform. In this way, the interaction between the questioner and the expert may be quickly and efficiently completed through the platform, thereby improving the efficiency of the information interaction.

Figure 4:
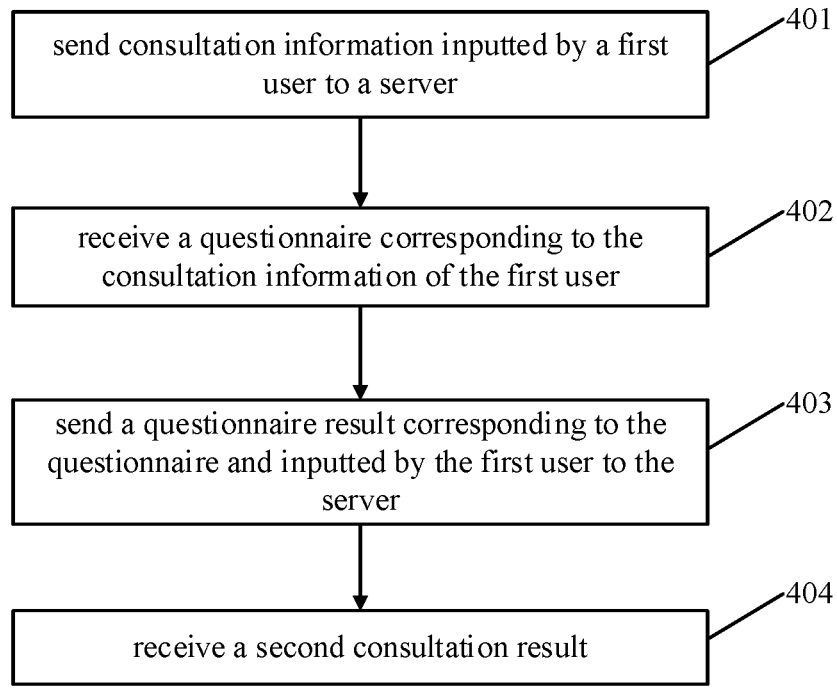
FIG. 4 is a flowchart of the method for processing consultation information according to another embodiment of the present disclosure.

Further referring to FIG. 4, FIG. 4 illustrates a flow 400 of a method for processing consultation information according to another embodiment of the present disclosure. The method for processing consultation information includes the following steps:

Step 401, sending consultation information inputted by a first user to a server.

In this embodiment, an executing body of the method for processing consultation information may be a user-end terminal equipment (e.g., the terminal 101, 102 or 103 shown in FIG. 1). The executing body may send the consultation information inputted by the first user to the server, and the server may send a questionnaire corresponding to the consultation information of the user to the first user after receiving a consultation request submitted by the first user.

Step 402, receiving a questionnaire corresponding to the consultation information of the first user.

In this embodiment, the above executing body may receive the questionnaire corresponding to the consultation information of the first user and sent by the server. Alternatively, when the consultation information includes a type of consultation content, the above executing body screens out a target questionnaire corresponding to the type of the consultation content according to the type of the consultation content, and sends the target questionnaire to the first user. The first user may receive the target questionnaire corresponding to the type of the consultation content.

Step 403, sending a questionnaire result corresponding to the questionnaire and inputted by the first user to the server.

In this embodiment, the above executing body may send the questionnaire result for the questionnaire completed by the first user to the server. After receiving the questionnaire result, the server inputs the questionnaire result into a preset consultation model to obtain a first consultation result, and then sends the questionnaire result and the first consultation result to a second user. The second user obtains a second consultation result based on the questionnaire result and the first consultation result, and sends the second consultation result to the server.

Step 404, receiving second consultation result.

In this embodiment, the above executing body may receive final consultation result sent by the server. Here, the second consultation result is submitted by the second user based on the questionnaire result and the first consultation result, and the first consultation result is obtained by inputting the questionnaire result into the preset consultation model.

In the above embodiment, the consultation information inputted by the first user is sent to the server, and the server may send the questionnaire corresponding to the consultation information of the user to the first user after receiving the consultation request submitted by the first user. The first user may receive the questionnaire corresponding to the consultation information of the first user and sent by the server, and send the questionnaire result completed by the first user for the questionnaire to the server. After receiving the questionnaire result, the server may input the questionnaire result into the preset consultation model to obtain the first consultation result, and then send the questionnaire result and the first consultation result to the second user. The second user obtains the second consultation result based on the questionnaire result and the first consultation result, and sends the second consultation result to the server. The first user receives the second consultation result sent by the server, thereby the interaction between the terminal of the first user, the server and the terminal of the second user is realized. The server acquires the basic information of the consulting party through the questionnaire to make a preliminary answer to the question of the consulting party before pushing the consultation information of the user to the answering party, pushes the basic information and the preliminary answer to the answering party, for reference by the answering party to provide a final consultation result, and returns the final consultation result to the consulting party, thereby shortening the interaction process between the consulting party and the answering party, and improving the efficiency of processing the consultation information.

Figure 5:
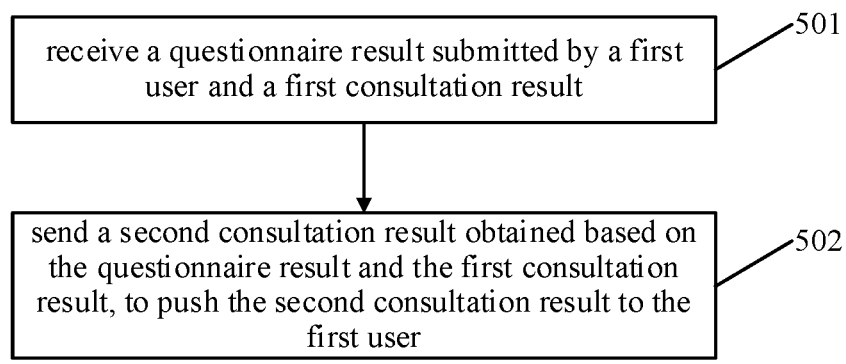
FIG. 5 is a flowchart of the method for processing consultation information according to another embodiment of the present disclosure.

Further referring to FIG. 5, FIG. 5 illustrates a flow 500 of a method for processing consultation information according to another embodiment of the present disclosure. The method for processing consultation information includes the following steps:

Step 501, receiving questionnaire result and first consultation result.

In this embodiment, an executing body (e.g., the terminal 107, 108 or 109 shown in FIG. 1) of the above method for processing consultation information may receive the questionnaire result and the first consultation result that are sent by a server. Here, the questionnaire result is questionnaire result corresponding to a questionnaire and submitted by a first user, the questionnaire corresponds to consultation information of the first user, and the first consultation result is obtained by inputting the questionnaire result into a preset consultation model.

In practice, after detecting the consultation information of a consulting party, the server may provide a questionnaire to the consulting party, to collect information related to the consulting party. The consulting party may submit a questionnaire result to the server through the terminal device used by the consulting party. Based on the questionnaire result provided by the consulting party, the server performs a preliminary judgment using the preset consultation model to obtain a first consultation result. Then, the server sends the questionnaire result of the consulting party and the first consultation result to an answering party. Through the terminal device used by the answering party, the answering party may receive the questionnaire result and the first consultation result that are sent by the server.

Step 502, sending a second consultation result obtained based on the questionnaire result and the first consultation result, to push the second consultation result to a first user.

In this embodiment, the above executing body may send the second consultation result obtained based on the questionnaire result and the first consultation result, to push the second consultation result to the first user.

In the above embodiment, the consultation information inputted by the first user is sent to the server, and the server may send a questionnaire corresponding to the consultation information of the user to the first user after receiving the consultation request submitted by the first user. The first user may receive the questionnaire corresponding to the consultation information of the first user and sent by the server, and send the questionnaire result for the questionnaire completed by the first user to the server. After receiving the questionnaire result, the server may input the questionnaire result into the preset consultation model to obtain the first consultation result, and then send the questionnaire result and the first consultation result to the second user. The second user obtains a second consultation result based on the questionnaire result and the first consultation result, and sends the second consultation result to the server. The first user receives the second consultation result sent by the server. Thereby the interaction between the terminal of the first user, the server and the terminal of the second user is realized. The server acquires the basic information of the consulting party through the questionnaire to make a preliminary answer to the question of the consulting party before pushing the consultation information of the user to the answering party, pushes the basic information and the preliminary answer to the answering party, for reference by the answering party to provide a final consultation result, and returns the final consultation result to the consulting party, thereby shortening the interaction process between the consulting party and the answering party, and improving the efficiency of processing the consultation information.

Figure 6:
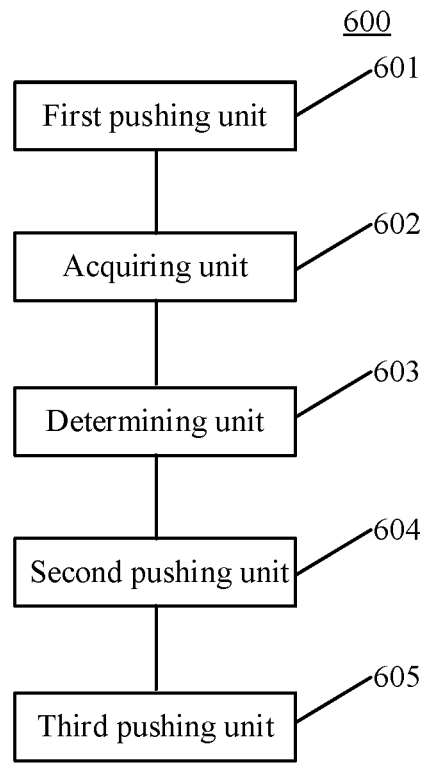
FIG. 6 is a schematic structural diagram of an apparatus for processing consultation information according to another embodiment of the present disclosure.

Further referring to FIG. 6, as an implementation of the method shown in the above drawings, an embodiment of the present disclosure provides an apparatus for processing consultation information. The embodiment of the apparatus corresponds to the embodiment of the method shown in FIG. 2, and the apparatus may be applied in various electronic devices.

As shown in FIG. 6, the apparatus 600 for processing consultation information provided in this embodiment includes: a first pushing unit 601, an acquiring unit 602, a determining unit 603, a second pushing unit 604 and a third pushing unit 605. Here, the first pushing unit 601 is configured to push, in response to receiving consultation information of a first user, a questionnaire corresponding to the consultation information to the first user. The acquiring unit 602 is configured to acquire questionnaire result corresponding to the questionnaire and submitted by the first user. The determining unit 603 is configured to input the questionnaire result into a preset consultation model to obtain a first consultation result. The second pushing unit 604 is configured to push the questionnaire result and the first consultation result to a second user. The third pushing unit 605 is configured to push, in response to receiving a second consultation result provided by the second user based on the questionnaire result and the first consultation result, the second consultation result to the first user.

In this embodiment, for processes of the first pushing unit 601, the acquiring unit 602, the determining unit 603, the second pushing unit 604 and the third pushing unit 605 in the apparatus 600 for processing consultation information, and their technical effects, reference may be made to relative descriptions of step 201, step 202, step 203, step 204 and step 205 in the corresponding embodiment of FIG. 2 respectively, which will not be repeatedly described herein.

According to the apparatus provided in the above embodiment of the present disclosure, before the consultation information of the user is pushed to the answering party, the basic information of the consulting party is acquired through the questionnaire to make a preliminary answer to the question of the consulting party. The basic information and the preliminary answer are pushed to the answering party for reference by the answering party to provide a final consultation result. Accordingly, the interaction process between the consulting party and the answering party is shortened, and the efficiency of processing the consultation information is improved.

Figure 7:
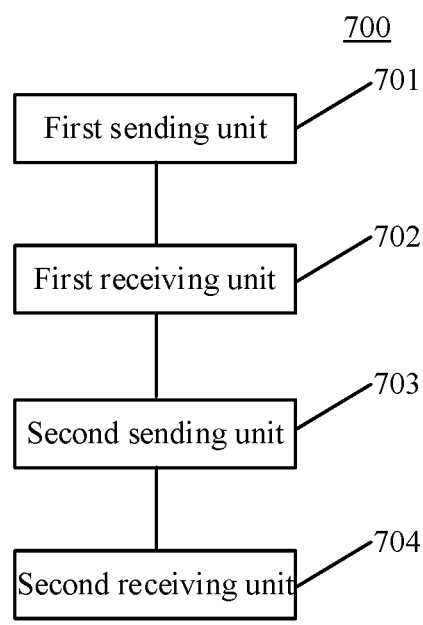
FIG. 7 is a schematic structural diagram of the apparatus for processing consultation information according to an embodiment of the present disclosure.

Further referring to FIG. 7, as an implementation of the method shown in the above drawings, another embodiment of the present disclosure provides an apparatus for processing consultation information. The embodiment of the apparatus corresponds to the embodiment of the method shown in FIG. 4, and the apparatus may be applied in various electronic devices.

As shown in FIG. 7, the apparatus 700 for processing consultation information provided in this embodiment includes: a first sending unit 701, a first receiving unit 702, a second sending unit 703 and a second receiving unit 704. Here, the first sending unit 701 is configured to send consultation information inputted by a first user to a server. The first receiving unit 702 is configured to receive a questionnaire corresponding to the consultation information of the first user. The second sending unit 703 is configured to send questionnaire result corresponding to the questionnaire and inputted by the first user to the server. The second receiving unit 704 is configured to receive a second consultation result, the second consultation result being submitted by a second user based on the questionnaire result and a first consultation result, and the first consultation result being obtained by inputting the questionnaire result into a preset consultation model.

According to the apparatus provided in the above embodiment of the present disclosure, before the consultation information of the user is pushed to the answering party, the basic information of the consulting party is acquired through the questionnaire, to make a preliminary answer to the question of the consulting party. The basic information and the preliminary answer are pushed to the answering party for reference by the answering party to provide a final consultation result. Accordingly, the interaction process between the consulting party and the answering party is shortened, and the efficiency of processing the consultation information is improved.

Figure 8:
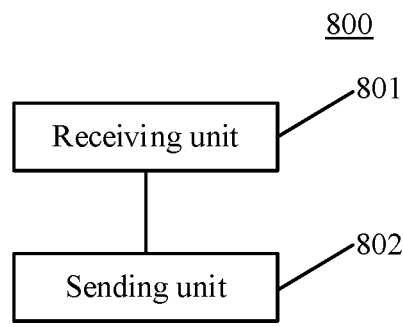
FIG. 8 is a schematic structural diagram of the apparatus for processing consultation information according to another embodiment of the present disclosure.

Further referring to FIG. 8, as an implementation of the method shown in the above drawings, another embodiment of the present disclosure provides an apparatus for processing consultation information. The embodiment of the apparatus corresponds to the embodiment of the method shown in FIG. 5, and the apparatus may be applied in various electronic devices.

As shown in FIG. 8, the apparatus 800 for processing consultation information provided in this embodiment includes: a receiving unit 801 and a sending unit 802. Here, the receiving unit 801 is configured to receive a questionnaire result submitted by a first user and a first consultation result, the questionnaire result being questionnaire result corresponding to a questionnaire corresponding to consultation information of the first user, and the first consultation result being obtained by inputting the questionnaire result into a preset consultation model. The sending unit 802 is configured to send a second consultation result obtained based on the questionnaire result and the first consultation result, to push the second consultation result to the first user.

According to the apparatus provided in the above embodiment of the present disclosure, before the consultation information of the user is pushed to the answering party, the basic information of the consulting party is acquired through the questionnaire, to make a preliminary answer to the question of the consulting party. The basic information and the preliminary answer are pushed to the answering party for reference by the answering party to provide a final consultation result. Accordingly, the interaction process between the consulting party and the answering party is shortened, and the efficiency of processing the consultation information is improved.

Figure 9:
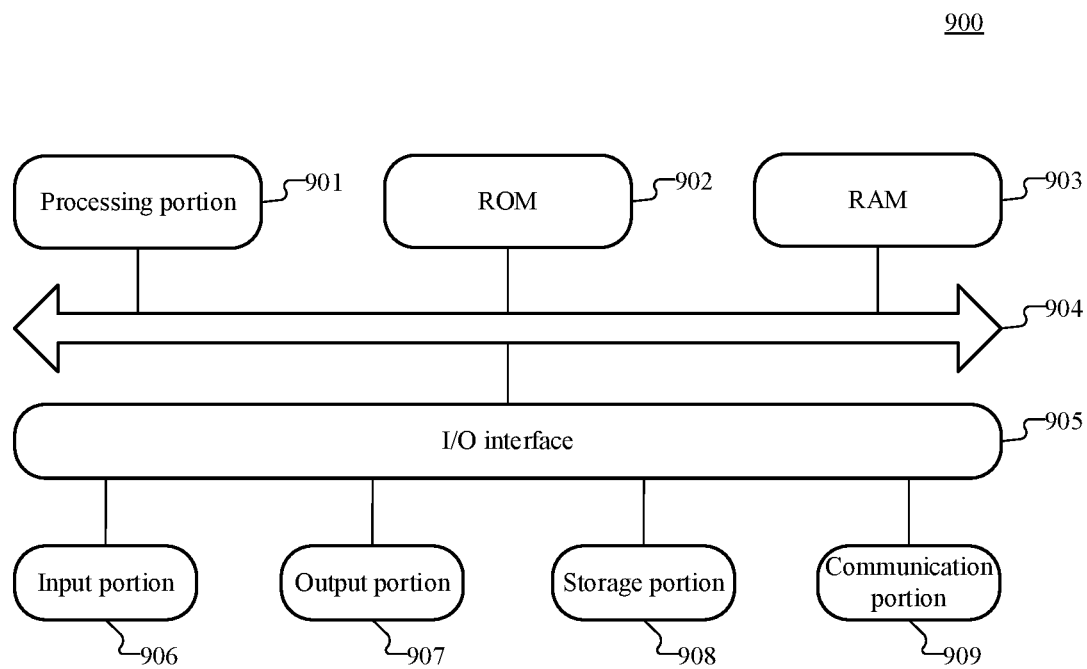
FIG. 9 is a schematic structural diagram of an electronic device adapted to implement embodiments of the present disclosure.

Referring to FIG. 9, FIG. 9 is a schematic structural diagram of an electronic device 900 (e.g., the server in FIG. 1) adapted to implement embodiments of the present disclosure. The server shown in FIG. 9 is only an example, and should not bring any limitation to the functionality and the scope of use of the embodiments of the present disclosure.

As shown in FIG. 9, the electronic device 900 may include a processing portion (e.g., a central processing unit, a graphics processing unit) 901, which may execute various appropriate actions and processes in accordance with a program stored in a read-only memory (ROM) 902 or a program loaded into a random access memory (RAM) 903 from a storage portion 908. The RAM 903 also stores various programs and data required by operations of the electronic device 900. The processing portion 901, the ROM 902 and the RAM 903 are connected to each other through a bus 908. An input/output (I/O) interface 905 is also connected to the bus 904.

The following components are connected to the I/O interface 905: an input portion 906 including a touch screen, a touch pad, a keyboard, a mouse, a camera, a microphone, an accelerometer, a gyroscope, etc.; an output portion 907 including a liquid crystal display device (LCD), a speaker, a virbrater, etc.; a storage portion 908 including a magnetic tape, a hard disk and the like; and a communication portion 909. The communication portion 909 allows the electronic device 900 to communicate with other devices to exchange data wired or wirelessly. Although FIG. 9 shows the electronic device 900 with various portions, it should be understood that the implementation or possession of all the portions shown is not required, alternative portions or more or fewer portions may be implemented in the electronic device 900. Each of the boxes shown in FIG. 9 may represent one portion or as many portions as needed.

In particular, according to embodiments of the present disclosure, the process described above with reference to the flow chart may be implemented in a computer software program. For example, an embodiment of the present disclosure includes a computer program product, which includes a computer program that is hosted in a machine-readable medium. The computer program includes program codes for executing the method as illustrated in the flow chart. In such an embodiment, the computer program may be downloaded and installed from a network via the communication portion 909, or may be installed from the storage portion 908, or may be installed from the ROM 902. The computer program, when executed by the processing portion 901, implements the above mentioned functionalities as defined by the methods of some embodiments of the present disclosure.

It should be noted that the computer readable medium in some embodiments of the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In some embodiments of the present disclosure, the computer readable storage medium may be any tangible medium containing or storing programs which can be used by a command execution system, apparatus or element or incorporated thereto. In some embodiments of the present disclosure, the computer readable signal medium may include data signal in the base band or propagating as parts of a carrier, in which computer readable program codes are carried. The propagating signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

The above computer readable medium may be a computer readable medium included in the above electronic device, or a stand-alone computer readable medium not assembled into the electronic device. The above computer readable medium carries one or more programs. The one or more programs, when executed by the electronic device, cause the electronic device to: push, in response to receiving consultation information of a first user, a questionnaire corresponding to the consultation information to the first user; acquire a questionnaire result corresponding to the questionnaire and submitted by the first user; input the questionnaire result into a preset consultation model to obtain first consultation result; push the questionnaire result and the first consultation result to a second user; and push, in response to receiving a second consultation result provided by the second user based on the questionnaire result and the first consultation result, the second consultation result to the first user.

Alternatively, the one or more programs, when executed by the electronic device, cause the electronic device to: send consultation information inputted by a first user to a server; receive a questionnaire corresponding to the consultation information of the first user; send a questionnaire result corresponding to the questionnaire and inputted by the first user to the server; and receive a second consultation result.

Alternatively, the one or more programs, when executed by the electronic device, cause the electronic device to: receive a questionnaire result and a first consultation result; and a send second consultation result obtained based on the questionnaire result and the first consultation result, to push the second consultation result to a first user.

A computer program code for executing operations in some embodiments of the present disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In the circumstance involving a remote computer, the remote computer may be connected to a user's computer through any network, including local area network (LAN) or wide area network (WAN), or may be connected to an external computer (for example, connected through Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion including one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The described units involved in embodiments of the present disclosure may be implemented by means of software or hardware. The described units may also be provided in a processor. For example, the processor may be described as: a processor including a first pushing unit, an acquiring unit, a determining unit, a second pushing unit and a third pushing unit. Here, the names of these units do not in some cases constitute a limitation to such units themselves. For example, the first pushing unit may alternatively be described as "a unit for pushing, in response to receiving consultation information of a first user, a questionnaire corresponding to the consultation information to the first user."

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A method for processing consultation information, comprising:

pushing, in response to receiving consultation information of a first user, a questionnaire corresponding to the consultation information to the first user, wherein the consultation information includes a consultation content type and a target consultation question;

acquiring a questionnaire result corresponding to the questionnaire and submitted by the first user;

inputting the questionnaire result into a preset consultation model, to obtain a first consultation result;

pushing the questionnaire result and the first consultation result to a second user; and in response to receiving a second consultation result provided by the second user based on the questionnaire result and the first consultation result, pushing the second consultation result to the first user, wherein the method further comprises:
  searching in a preset consultation database for a preset consultation question matching the target consultation question, wherein the preset consultation database includes preset consultation questions and preset consultation results corresponding to the preset consultation questions, and the preset consultation question matching the target consultation question refers to that a matching degree between the preset consultation question and the target consultation question is greater than a first preset threshold;
  in response to determining that a first preset consultation question matching the target consultation question is found in the preset consultation database, pushing a preset consultation result corresponding to the first preset consultation question to the first user;
  in response to determining that the preset consultation question matching the target consultation question is not found in the preset consultation database, searching in the preset consultation database for candidate preset consultation questions having association degrees with the target consultation question greater than a second preset threshold value, and pushing the candidate preset consultation questions to the first user; and
  acquiring a second preset consultation question selected by the first user from the candidate preset consultation questions, and pushing a preset consultation result corresponding to the second preset consultation question to the first user, and wherein the method further comprises:
  pushing common consultation questions having frequencies of being consulted greater than a preset threshold value and consultation results corresponding to the common consultation questions to the first user;
  in response to detecting that the first user performs a preset association confirmation operation on a consultation result of a third consultation question, inputting the third consultation question, the consultation result corresponding to the third consultation question, and the questionnaire result into the preset consultation model to obtain a third consultation result; and
  pushing the obtained third consultation result to the second user.

2. The method according to claim 1, wherein the pushing, in response to receiving the consultation information of the first user, the questionnaire corresponding to the consultation information to the first user comprises:
  in response to receiving the consultation information of the first user, searching in a pre-stored questionnaire set for a target questionnaire corresponding to the type of the consultation content; and
  pushing the target questionnaire to the first user.

3. The method according to claim 1, wherein the questionnaire includes a structured questionnaire, the structured questionnaire being used for collecting basic information of a user related to consultation information of the user.

4. The method according to claim 1, wherein searching in the preset consultation database for the preset consultation question matching the target consultation question, wherein the preset consultation question matching the target consultation question refers to that the matching degree between the preset consultation question and the target consultation question is greater than the first preset threshold, comprises:
  calculating a similarity between the target consultation question and each preset consultation question in the consultation database to obtain a similarity value, and using the similarity as the matching degree.

5. The method according to claim 1, wherein searching in the preset consultation database for the candidate preset consultation questions having association degrees with the target consultation question greater than the second preset threshold value comprise:
  recognizing a keyword included in the target consultation question;
  searching in the preset consultation database for a preset consultation question containing the same keyword; and
  using the preset consultation question containing the same keyword as a candidate preset consultation question having an association degree with the target consultation question greater than the second preset threshold value.

6. An electronic device, comprising:
  one or more processors; and
  a storage apparatus, configured to store one or more programs,
  wherein the one or more programs, when executed by the one or more processors, cause the one or more processors to implement operations of the method according to claim 1.

7. The device according to claim 6, wherein the pushing, in response to receiving the consultation information of the first user, the questionnaire corresponding to the consultation information to the first user comprises:
  in response to receiving the consultation information of the first user, searching in a pre-stored questionnaire set for a target questionnaire corresponding to the type of the consultation content; and
  pushing the target questionnaire to the first user.

8. The device according to claim 6, wherein the questionnaire includes a structured questionnaire, the structured questionnaire being used for collecting basic information of a user related to consultation information of the user.

9. The device according to claim 6, wherein searching in the preset consultation database for the preset consultation question matching the target consultation question, wherein the preset consultation question matching the target consultation question refers to that the matching degree between the preset consultation question and the target consultation question is greater than the first preset threshold, comprises:
  calculating a similarity between the target consultation question and each preset consultation question in the consultation database to obtain a similarity value, and using the similarity as the matching degree.

10. The device according to claim 6, wherein searching in the preset consultation database for the candidate preset consultation questions having association degrees with the target consultation question greater than the second preset threshold value comprise:
  recognizing a keyword included in the target consultation question;
  searching in the preset consultation database for a preset consultation question containing the same keyword; and
  using the preset consultation question containing the same keyword as a candidate preset consultation question having an association degree with the target consultation question greater than the second preset threshold value.

11. A non-transitory computer readable medium, storing a computer program, wherein the program, when executed by a processor, causes the processor to perform the method according to claim 1.

12. A method for processing consultation information, performed by a first server, comprising:
  sending consultation information inputted by a first user to a second server;
  receiving a questionnaire corresponding to the consultation information of the first user;
  sending a questionnaire result corresponding to the questionnaire and inputted by the first user to the second server; and
  receiving a second consultation result, the second consultation result being submitted by a second user based on the questionnaire result and a first consultation result, and the first consultation result being obtained by inputting the questionnaire result into a preset consultation model,
  wherein the method further comprises:
    receiving a preset consultation result or candidate preset consultation questions from a second server, wherein the second server is configured to:
      search in a preset consultation database for a preset consultation question matching the target consultation question, wherein the preset consultation database includes preset consultation questions and preset consultation results corresponding to the preset consultation questions, and the preset consultation question matching the target consultation question refers to that a matching degree between the preset consultation question and the target consultation question is greater than a first preset threshold;
      in response to determining that a first preset consultation question matching the target consultation question is found in the preset consultation database, push a preset consultation result corresponding to the first preset consultation question to the first server;
      in response to determining that the preset consultation question matching the target consultation question is not found in the preset consultation database, search in the preset consultation database for candidate preset consultation questions having association degrees with the target consultation question greater than a second preset threshold value, and push the candidate preset consultation questions to the first server;
      acquire a second preset consultation question selected by the first user from the candidate preset consultation questions, and push a preset consultation result corresponding to the second preset consultation question to the first server;
      push common consultation questions having frequencies of being consulted greater than a preset threshold value and consultation results corresponding to the common consultation questions to the first user;
      in response to detecting that the first user performs a preset association confirmation operation on a consultation result of a third consultation question, input the third consultation question, the consultation result corresponding to the third consultation question, and the questionnaire result into the preset consultation model to obtain a third consultation result; and
      push the obtained third consultation result to the second user.

13. The method according to claim 12, wherein the receiving the questionnaire corresponding to the consultation information of the first user comprises:
  receiving a target questionnaire corresponding to the type of the consultation content.

14. An electronic device, comprising:
  one or more processors; and
  a storage apparatus, configured to store one or more programs,
  wherein the one or more programs, when executed by the one or more processors, cause the one or more processors to implement the method according to claim 12.

15. The electronic device according to claim 14, wherein the receiving the questionnaire corresponding to the consultation information of the first user comprises:
  receiving a target questionnaire corresponding to the type of the consultation content.

16. A non-transitory computer readable medium, storing a computer program, wherein the program, when executed by a processor, causes the processor to perform the method according to claim 12.

* * * * *